United States Patent [19]

Bland et al.

[11] Patent Number: 5,333,298
[45] Date of Patent: Jul. 26, 1994

[54] SYSTEM FOR MAKING DATA AVAILABLE TO AN OUTSIDE SOFTWARE PACKAGE BY UTILIZING A DATA FILE WHICH CONTAINS SOURCE AND DESTINATION INFORMATION

[75] Inventors: Dennis L. Bland; John R. Kast, both of Phoenix, Ariz.

[73] Assignee: Honeywell Inc., Minneapolis, Minn.

[21] Appl. No.: 741,920

[22] Filed: Aug. 8, 1991

[51] Int. Cl.⁵ .............................................. G06F 3/00
[52] U.S. Cl. ................................ 395/500; 364/229; 364/239; 364/DIG. 1
[58] Field of Search ............... 395/700, 500, 600, 800, 395/200

[56] References Cited

U.S. PATENT DOCUMENTS

| 3,955,180 | 5/1976 | Hirtle | 395/500 |
| 4,688,170 | 8/1987 | Waite | 395/500 |
| 4,734,854 | 3/1988 | Afshar | 395/700 |
| 4,875,186 | 10/1989 | Blume | 395/500 |

Primary Examiner—Thomas C. Lee
Assistant Examiner—Jennifer M. Orzech
Attorney, Agent, or Firm—Arthur A. Sapelli; William Udseth

[57] ABSTRACT

A computer system, having external peripherals, includes an operating system and application packages residing therein. Data exchange logic permits an outside application package (generated by a third party to perform a predefined application function in a general purpose computer environment) to be integrated into the computer system. A data file containing information for making the necessary data available to the outside application package in the computer system is generated off-line. When the outside application package is executing in the computer system and it is desired to obtain the necessary data, a first package is accessed. The first package utilizes information contained in the data file to generate commands to obtain the necessary data. Information of the data file includes source information of the necessary data internal to or external to the computer system. If, however it is desired to output results of the predefined application function, a second package is accessed. The second package utilizes information contained in the data file to generate commands to cause the results to be outputted. The information of the data file includes destination information of the results to be outputted external to or internal to the computer system.

7 Claims, 4 Drawing Sheets

SYSTEM FOR MAKING DATA AVAILABLE TO AN OUTSIDE SOFTWARE PACKAGE BY UTILIZING A DATA FILE WHICH CONTAINS SOURCE AND DESTINATION INFORMATION

BACKGROUND OF THE INVENTION

The present invention relates to a method of data transfer, and more particularly, to a method for providing a common interface between various sources of data.

Methods currently in use for providing a data exchange between two systems are very project-specific or data source/destination specific. Other methods currently in use require the user to setup and maintain a redundant data base.

The method of data transfer of the present invention permits data source/destination to be incorporated into the data transfer system without requiring any changes by the end user. The method of the present invention permits acting upon many different locations of a data bank by conforming to an existing data transfer protocol associated with each data location of the data bank. Further, the data transfer method of the present invention is accomplished such that speed requirements of real-time systems are met.

SUMMARY OF THE INVENTION

Thus there is provided by the present invention, a method of data transfer. A computer system of the present invention has predefined peripherals operatively connected thereto. The computer system includes interface logic for communicating with the predefined peripherals. Further, the computer system includes an operating system and application packages residing therein which execute under control of the operating system. The computer system includes data exchange logic which permits an outside application package (generated by a third party) to be integrated into the computer system, (the outside application package having been created to perform a predefined application function in a general purpose computer system, the environment of the general purpose computer system including a computer and an operating system of the same type as that of the computer system.) The source of any necessary data of the outside application package defined for the general purpose computer system environment is different than the source of the necessary data in the computer system. The data exchange logic provides a method of making the necessary data available from the predefined peripherals of the computer system to the outside application package when the outside application program is executing in the computer system. A data file containing information for making the necessary data available to the outside application package in the computer system is generated off-line. When the outside application package is executing in the computer system and it is desired to obtain the necessary data, a first package is accessed. The first package utilizes information contained in the data file to generate commands to obtain the necessary data. Information of the data file includes source information of the necessary data internal to or external to the computer system. If, however, it is desired to output results of the predefined application function, a second package is accessed. The second package utilizes information contained in the data file to generate commands to cause the results to be outputted. The information of the data file includes destination information of the results to be outputted external to or internal to the computer system. Thus, by the generation of the data file and the utilization of the data file by the first and second packages, application packages can be integrated into an environment even though the application package at the time of creation had limited knowledge of the environment external to the computer system.

Accordingly, it is an object of the present invention to provide a method to permit the sharing of data between independently developed subsystems.

It is another object of the present invention to provide a method for permitting the sharing of data between applications in a computer system that incorporates a plurality of independently developed and/or specialized software applications.

It is still another object of the present invention to provide a method for permitting the sharing of data between applications in a computer system that incorporates a plurality of independently developed and/or specialized software applications, wherein the data transfer operates in a real-time or near-real-time environment.

These and other objects of the present invention will become more apparent when taken in conjunction with the following description and attached drawings, wherein like characters indicate like parts, and which drawings form a part of the present application.

DETAILED DESCRIPTION

Figure 1:
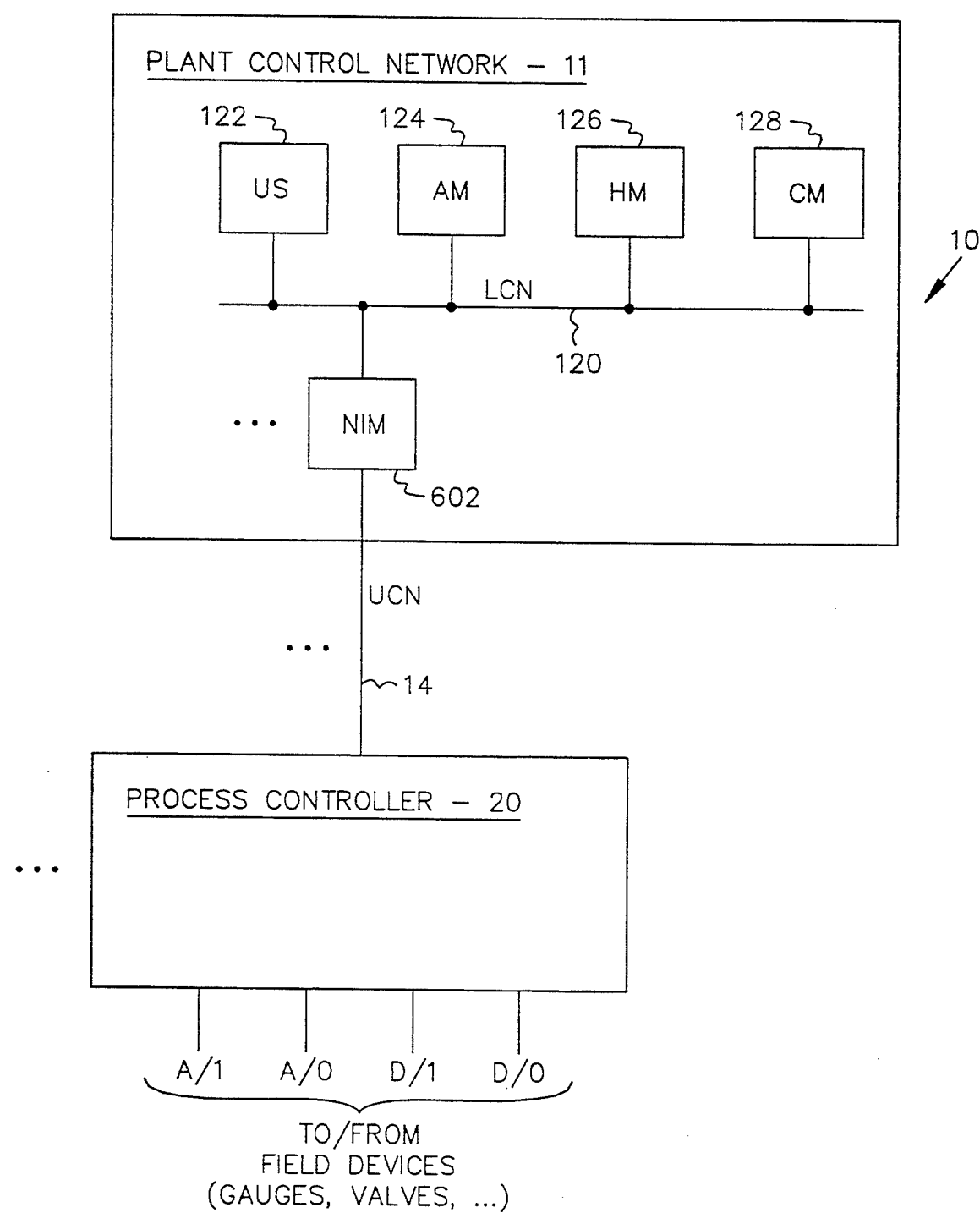
FIG. 1 shows a block diagram of a process control system in which the present invention can be utilized.

Before describing the method of the present invention, it will be helpful in understanding a system environment in which the present invention can be utilized. Referring to FIG. 1, there is shown a block diagram of a process control system 10 in which the method of the present invention can be found. The process control system 10 includes a plant control network 11, in which a process controller 20 is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controller 20, interfaces analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of a controlled process, in conjunction with the plant operator, and obtains all the information needed to perform the supervisory function, and includes an interface with the operator. The plant control network 11 includes a plurality of physical modules, which include a universal operator station module (US) 122, an application module (AM) 124, a history module (HM) 126, a computer module (CM) 128, and duplicates of these modules (and additional types of modules, not shown) as necessary to perform the required control/supervisory function of the process being controlled. Each of these physical modules is operatively connected to a local control network (LCN) 120 which permits each of these modules to communicate with each other as necessary. The NIM 602 provides an interface between the LCN 120 and the UCN 14.

Universal operator station module 122 of plant control network 11 is the work station for one or more plant operators. It includes an operator console which is the interface between the plant operator, or operators, and the process or processes of the plant for which they are responsible. Each universal operator station module, 122, and any backup modules (not shown) for example, is connected to LCN 120, and all communications between the universal operator station module, 122, and any other module 124, 126, 602 . . . of the plant control network 11, including any backup modules (not shown) is by means of LCN 120. Universal operator station module 122 has access to data that is on LCN 120 and the resources and data available through, or from, any of the other modules of plant control network 11. Each universal station module 122 includes a cathode ray tube display, designated CRT, which includes a video display generator, an operator keyboard, a floppy disc data storage device, trend pen recorders, and status displays, for example (not shown).

Another type of physical module included in plant control network 11 is history module 126 which provides mass data storage capability. Each history module 126 includes at least one conventional disc mass-storage device such as a Winchester disc, which disc storage device provides a large-volume of nonvolatile, nonremovable storage capability for binary data. The types of data stored by such a mass-storage device are typically trend histories, or data from which such trends can be determined, data that constitutes, or forms, CRT-type displays, copies of programs for the units of the process controller 20 for modules 122, 124, . . . or for units of the modules of plant control network 11.

Another type of module incorporated into the plant control network 11 is an application module 124. Application module 124 provides additional data-processing capability in support of the process control functions performed by the process controllers 20, such as data acquisition, alarming, batch history collection, and providing continuous control computational facilities when needed. The data processing capability of application module 124 is provided by its module processor and module memory (not shown).

Computer module 128 uses the standard or common units of all physical modules to permit a medium-to-large scale, general-purpose data-processing system to communicate with other modules 122, 124, . . . of plant control network 11 and the units of such modules over LCN 120 and the units of process controller 20 via NIM 602. Data processing systems of a computer module 128 are used to provide supervisory, optimization, generalized user program preparation and execution of such programs in higher-level program languages. Typically, the data-processing systems of the computer module 128 have the capability of communicating with other such systems by a communication processor and communication lines, as is well know in the art.

LCN 120 of the preferred embodiment is a high-speed, bit serial dual redundant communication bus that interconnects all the modules 122, 124, . . . of plant control network 11. Bus 11 provides the only data transfer path between the principal sources of data such as NIM 602, application module 124, and history module 126, and principal users of such data, such as universal operator station module 122, computer module 128, and application module 124. Bus 11 also provides the communication medium over which large blocks of data, such as memory images, can be moved from one module such as history module 126 to universal station module 122.

Each of the physical modules 122, . . . of the plant control network 11 of the system of the preferred embodiment includes certain, or required, standard units. A more complete description of the plant control network 11, and the physical modules can be had by reference to U.S. Pat. No. 4,607,256.

The method of the present invention will now be described. The computer module (CM) 128 can include one of several kinds of computers. The HoneFell DPS-6 computers have been used in the CM 128. Currently, the computer module 128 of the process control network 11, which utilizes the method of the present invention, includes a Digital Equipment Corp VAX system.

Existing applications software which performs some predetermined function (e.g., optimization, modeling, statistical analysis, etc., . . .) is to be purchased, leased, licensed, or otherwise obtained (i.e., prepared by an independent third party), and desired to be utilized in the system 10 described above. These application generally operate on data and output the results generated therefrom. This data is generally available to the procedure of the application program through some predefined files, call subroutines, . . . , and the like. The method of the present invention integrates the application into the system 10 by essentially defining (or redefining) multiple data sources and destinations, thereby making the necessary input data available to the procedure (portion of the application program) and providing a way of outputting the data of the application program to the system 10.

Figure 2:
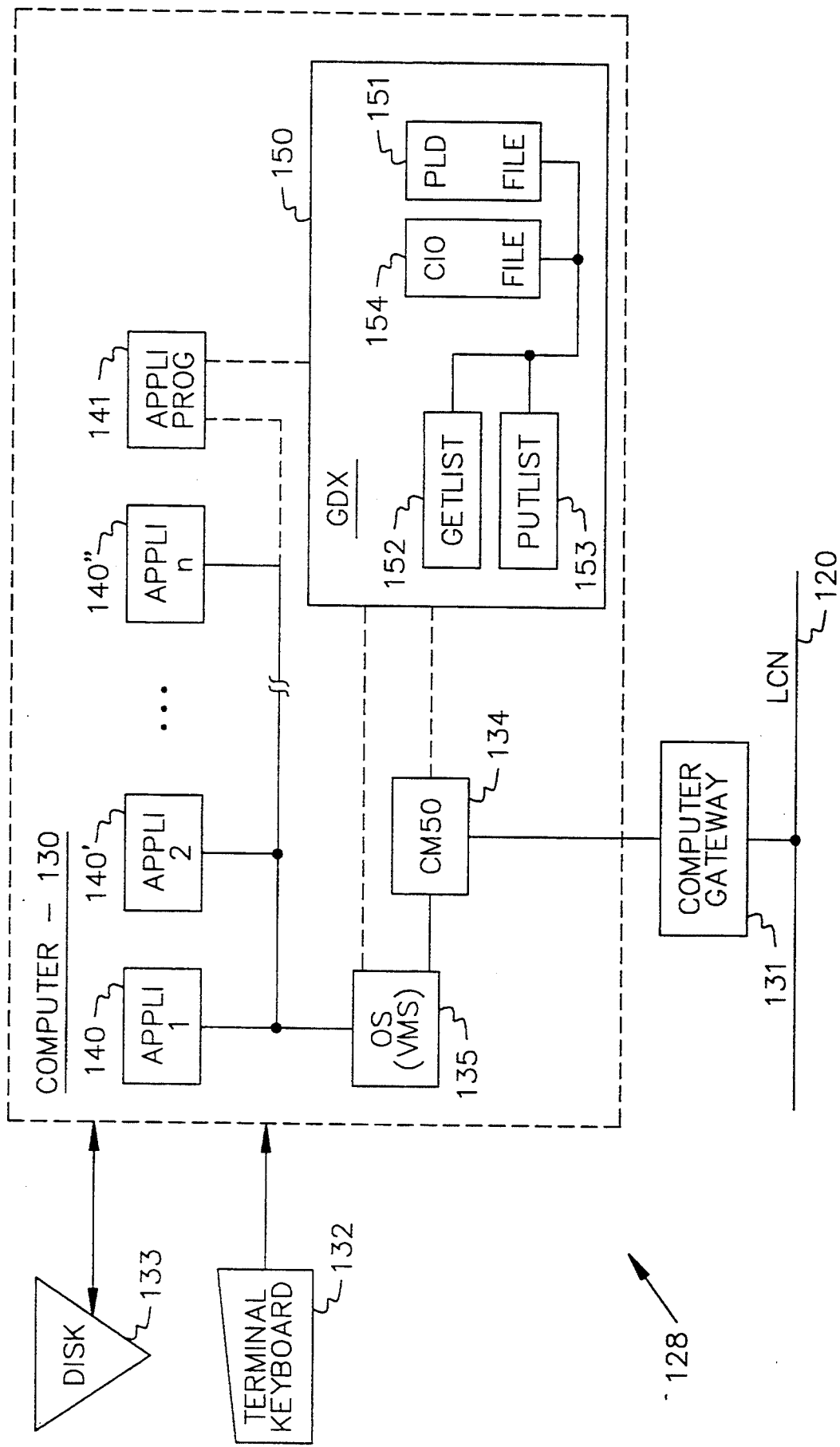
FIG. 2 shows a functional block diagram of a computer module of a process control system which includes the method of control of the preferred embodiment of the present invention.

Referring to FIG. 2, there is shown a functional block diagram of the computer module (CM) 128 of the process control system 10 which includes control logic defining the method of the preferred embodiment of the present invention. The computer module 128 includes a "computer" 130, having a variety of programs or (software) packages, including application programs 140, 140', . . . and supporting programs. (It will be recognized by those skilled in the art that the computer 130 is in reality a processor along with its associated 1B memory.) In the preferred embodiment of the present invention, the computer 130 of the CM 128 is a Digital Equipment Corporation VAX engine and includes its corresponding operating system VMS. An interface program (CM 50) 134 interfaces the packages and operating system (OS), or supervisory logic, 135 to the LCN 120 via interface hardware (i.e., computer gateway) 131 in accordance with a predetermined protocol. Also included in the CM 128 of the preferred embodiment of the present invention is a terminal keyboard 132 and a storage device (disk) 133. Those skilled in the art will recognize that additional devices may be included, e.g., display devices, . . .

Still referring to FIG. 2, an application program (APP PROG) 141, written or created for the VAX/VMS environment without any knowledge or regard to communicating in the process control system, and more specifically, to communicating with the LCN, is to be added to the computer 130. Also included in the computer 130 is a package (GDX 150) which implements the control logic of the present invention. The GDX package 150 interacts with the application program 141, the operating system 135, and the interface program 134. The GDX package 150 includes programs and files, i.e., a GETLIST program 152, a PUTLIST program 153, a point list definition (PLD) file 151, and a control input/output (CIO) file 154. Also included is a MAKELIST program (not shown) which will be discussed below. An individual CIO file 154 and PLD file 151 exists for each application program 141 which is included in the computer 130 and generated by a "third party" (i.e., not generated for communication via the LCN). The procedure portion of the application program 141 remains intact.

An operator, utilizing the terminal keyboard 132 for example, inputs information identifying the source and destination in the process control system of previously identified application program variables of the application program. Further, information is inputted specifying what to do with the data obtained, the format of the data (i.e., whether the data needs to be translated into a format required by the application program, . . .). This information composes the PLD file 151. The MAKELIST program (not shown) is utilized in an "off-line" mode (i.e., the application program 141 is not executing). From the information contained in the PLD file, MAKELIST obtains specific information that is used during application execution which will be discussed hereinunder. From this information the CIO file 154 is generated. In this manner, the data can be obtained and placed in a file or main memory location in which the application program is expecting to see the data during execution. It will be recognized by those skilled in the art that these files or main memory locations can be generated by a variety of methods utilizing a large number of different computer equipment.

Figure 3:
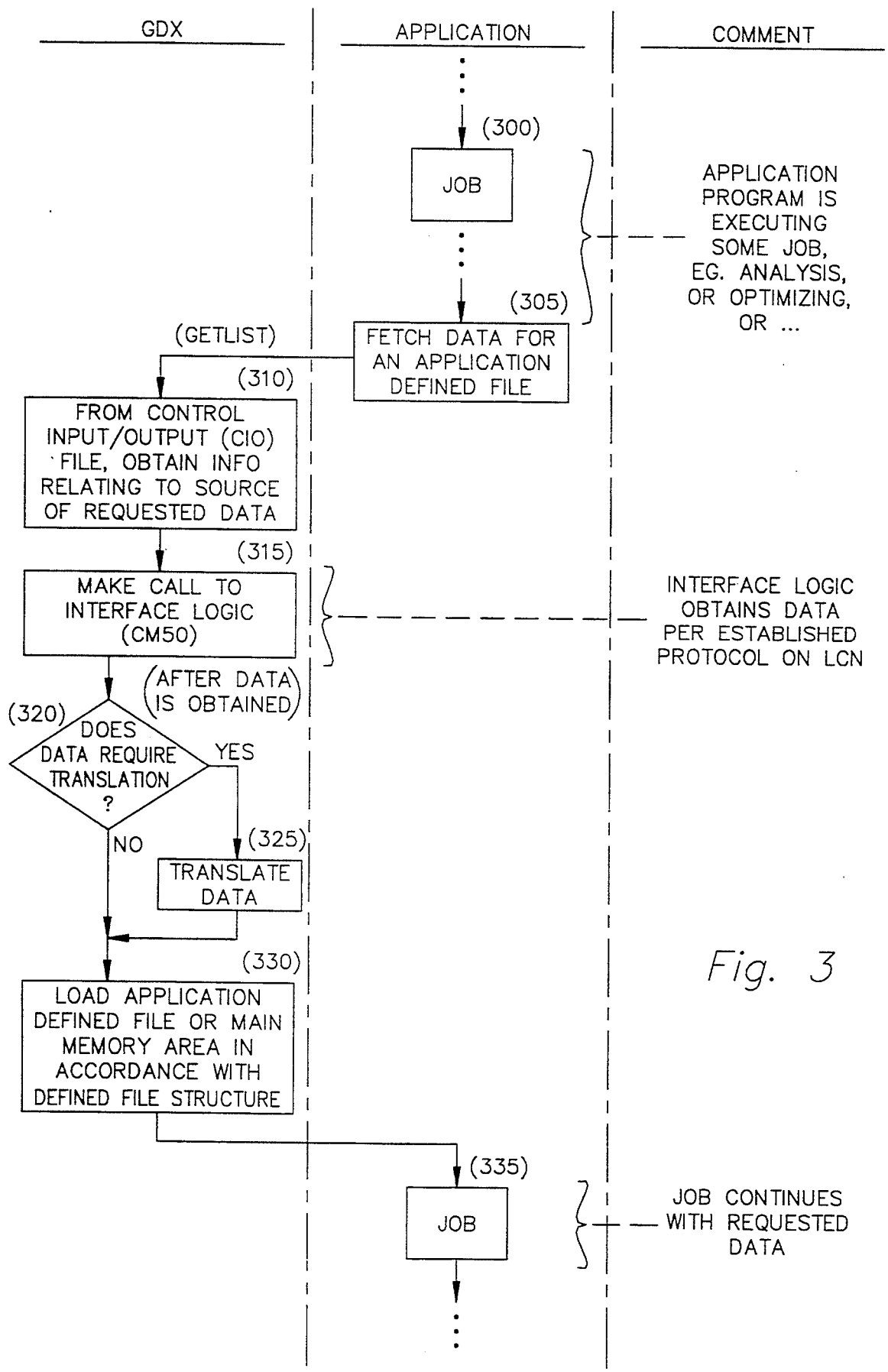
FIG. 3 shows a flow diagram overview of an input data sequence.

Referring to FIG. 3, a flow diagram overview of an input data sequence is shown. Once the corresponding PLD file 151 and CIO file 154 are generated and residing in the VAX/VMS and GDX environment of the computer 130, the application program 141 can be executed to perform its designed application function or job (block 300)in the process control system 10. When the application program 141 desires to access (or fetch) application data (block 305), the call for data invokes the GETLIST program 152. The GETLIST program 152 obtains the corresponding CIO file 154 identifying the data and the data source (block 310), makes a call to the interface program 134 (block 315), and the interface program 134 sets up the required I/O commands in order to obtain the requested data. This is achieved in the programs as a function of the hardware being utilized and in a manner well known to those skilled in the art. If translation is required, the data is translated to the format specified in the CIO file 154 in a manner well known to those skilled in the art (block 325). When the data is in the required format, the data is then placed in a file (i.e., an area of memory of computer 130 where the application program 141 expects to find the data (block 330) in accordance with information from the CIO file 154. The application program then proceeds to perform its application function-job (block 335).

Figure 4:
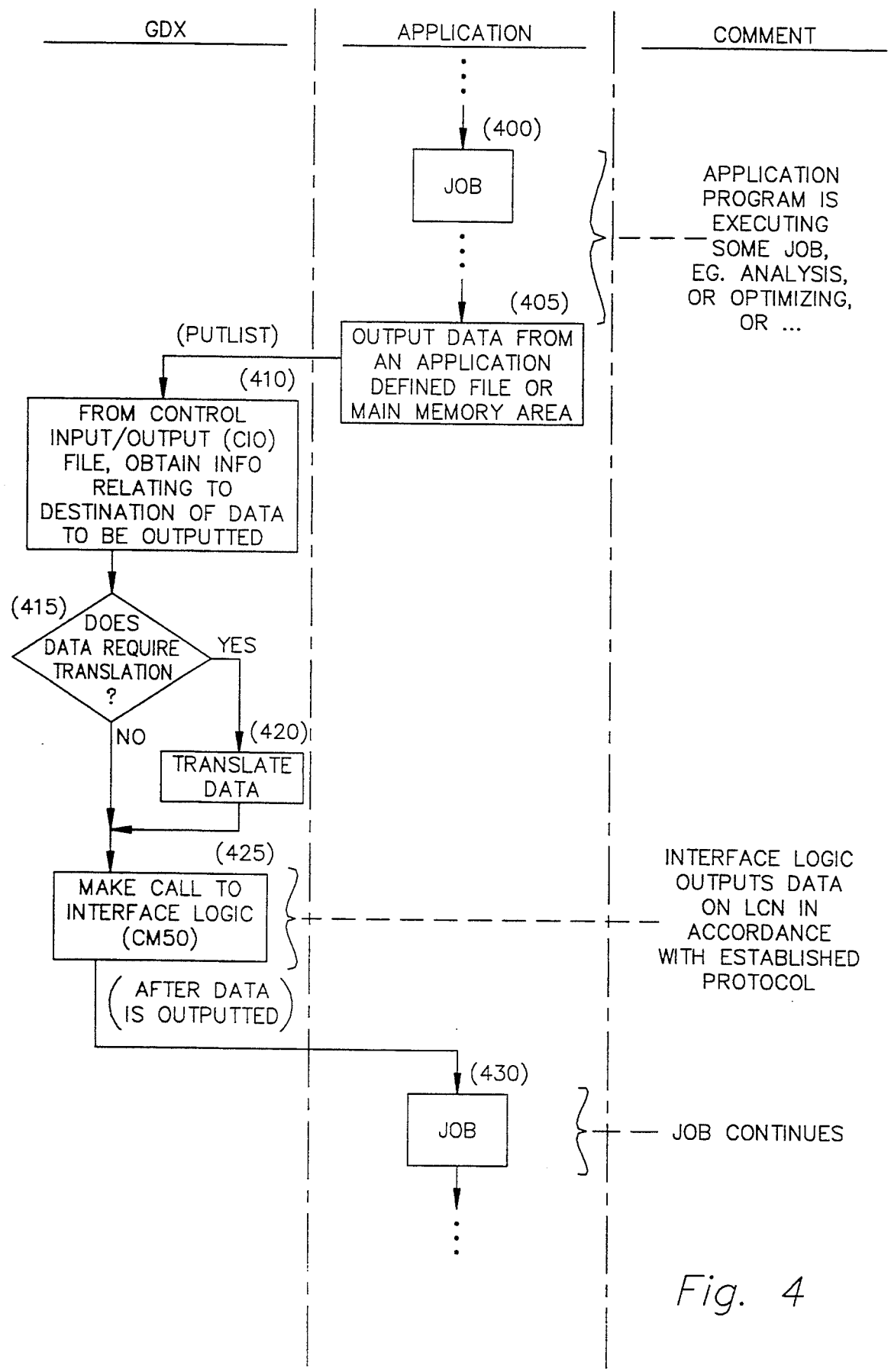
FIG. 4 shows a flow diagram overview of an output sequence of the preferred embodiment of the present invention.

When the job is completed, the results of the application program 141 must be outputted. Referring to FIG. 4, there is shown an overview of an output sequence for the application program 141. After the application program 141 (job) completes its function (block 400) and desires to output the results of its execution (block 405), an output call is made which invokes the PUTLIST program 153. The corresponding CIO file 154 is accessed in order to ascertain necessary information about the data to be outputted, including its location in computer 130 memory, its format, if translation is necessary and to what form, and to ascertain the destination of the data within the process control system (block 410). If translation is required (block 415), the data is translated (block 420).

Once the data is ready to be outputted, the PUTLIST program 153 invokes the interface program 134 (block 425) which initiates the control sequences in accordance with an established protocol to cause the data to be outputted to the specified destinations. After the data is outputted, the application program continues to perform its function in its normal sequence (block 430).

The initiation of control sequences, translation of data and invoking or calling various control programs are a function of the operating system and the hardware of the computer 130 and its associated interfaces and peripherals, and is accomplished in a manner well known to those skilled in the respective arts. Thus it is seen that an application program is integrated into a system without any consideration to the peripherals utilized in the system (i.e., where the data is coming from or going to).

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

We claim:

1. In a first computer system 130, having predefined peripherals (132, 133) operatively connected thereto, said first computer system including interface logic for communicating with said predefined peripherals, and further wherein said first computer system includes an operating system (135) and application software packages (140) residing therein which execute under control of said operating system, and further wherein said first computer system includes a data exchange logic (150) for permitting an outside application software package (141) to be integrated into the first computer system, the outside application software package being created to perform a predefined application function in a second computer system, said outside application software package having identified application variables, the environment of the second computer system including a computer and an operating system of the same type as that of the first computer system, the source of the identified application variables of the outside application software package defied for the second computer system being different than the source of the identified application variables in the first computer system, the data exchange logic providing a method of making the identified application variables available from the predefined peripherals of the first computer system to the outside application software package integrated into the first computer system, said method comprising the steps of:

a) generating a data file containing a point list definition file for identifying source and destination information of the identified application variables and a control file for specifying what to do with data input to or output form the outside application software package, when said outside application software package is executing in said first computer system; and b) i) accessing a first package (152), said first package including first program logic and first preselected information of said data file, when it is desired to obtain the identified application variables, said first package utilizing information contained in said data file to generate commands to obtain the identified application variables, the information of said data file including the source of the identified application variables internal to or external to said first computer system; and ii) accessing a second package (153), said second package including second program logic and second preselected information of said data file, when it is desired to output results of performing the predefined application function, said second package utilizing information contained in said data file to generate commands to cause the results to be outputted, the information of said data file including a destination of the results to be outputted external to or internal to said first computer system, thereby permitting an outside application software program to be integrated into said first computer system.

2. A method of making data available, according to claim 1, wherein said first package (152) utilizing information contained in said data file comprises the steps of:

a) obtaining information, relating to the source of data to be inputted, from said data files;

b) invoking an interface package (134) to cause the specified data to be inputted from the source identified in the obtained information; and c) loading the inputted data in a memory location of the first computer system in which the outside application software package expects to find the requested data.

3. A method of making data available, according to claim 2 wherein the first package (152) utilizing information contained in said data file further comprises the step of:

a) after the data has been received from the source, determining if the inputted data requires translation, and if so i) translating the data prior to the step of loading; otherwise ii) loading the inputted data.

4. A method of making data available, according to claim 3, wherein said second package comprises the steps of:

a) obtaining information, relating to the destination of data to be outputted, from said data files; and b) invoking an interface package (134) to cause said data to be outputted to the destination contained in the obtained information.

5. A method of making data available, according to claim 4, wherein said second package further comprises the step of:

a) determining if the data to be outputted requires translation, and if so, i) translating the data prior to outputting; otherwise ii) outputting the data to the destination indicated from said data file 6. A method of making data available, according to claim 1, wherein said second package comprises the steps of:

a) obtaining information, relating to the destination of data to be outputted, form said data files; and b) invoking an interface package (134) to cause said data to be outputted to the destination contained in the obtained information.

7. In a first computer system (130), having predefined peripherals (132, 133) operatively connected thereto, said first computer system including interface logic for communicating with said predefined peripherals, and further wherein said first computer system includes an operating system (135) and application software packages (140) residing therein which execute under control of said operating system, and further wherein said first computer system includes a data exchange (150) logic for permitting an outside application software package (141) to be integrated into the first computer system, the outside application package being created to perform a predefined application function in a second computer system said outside application package having identified application variables the environment of the second computer system including a computer and an operating system of the same type as that of the first computer system, the source of the identified application variables of the outside application software package defined for the second computer system being different than the source of the identified application variables in the first computer system, the data exchange logic providing means of making the identified application variables available form the predefined peripherals of the first computer system to the outside application software package integrated into the first computer system, said data exchange logic comprising:

a) means for generating a data file containing a point list definition file for identifying source and destination information of the identified application variables and a control file for specifying what to do with data input to or output from the outside application software package, when said outside application software package is executing in said first computer system; and b) i) means for accessing a first logic package (152) by said outside application software package when it is desired to obtain the identified application variables, said first logic package operatively coupled to said means for generating, said first logic package utilizing information contained in said data file to generate commands to obtain the identified application variable, the information of said data file including the source of the identified application variables internal to or external to said first computer system; and ii) means for accessing a second logic package (153) by said outside application software package when it desired to output results of performing the predefined application function, said second logic package being operatively coupled to said means for generating, said second logic package utilizing information contained in said data file to generate commands to case the results to be outputted, the information of said data file including a destination of the results to be outputted external to or internal to said first computer system, thereby permitting an outside application software program to be integrated into said first computer system.

* * * * *